US012715617B2

(12) United States Patent
Dougherty

(10) Patent No.: US 12,715,617 B2
(45) Date of Patent: Aug. 25, 2026

(54) CONTINUOUS ROTATION ROVER SUSPENSION WITH CONSTANT VERTICAL STEERING AXIS

(71) Applicant: Maxar Space LLC, Westminster, CO (US)

(72) Inventor: Sean Dougherty, Arvada, CO (US)

(73) Assignee: LANTERIS SPACE LLC, Palo Alto, CA (US)

( * ) Notice: Subject to any disclaimer, the term of this patent is extended or adjusted under 35 U.S.C. 154(b) by 648 days.

(21) Appl. No.: 18/116,106

(22) Filed: Mar. 1, 2023

(65) Prior Publication Data

US 2023/0286672 A1 Sep. 14, 2023

Related U.S. Application Data

(60) Provisional application No. 63/319,687, filed on Mar. 14, 2022.

(51) Int. Cl.

| | |
|---|---|
| ***B64G 1/16*** | (2006.01) |
| ***B60G 3/00*** | (2006.01) |
| ***B62D 5/04*** | (2006.01) |
| ***B62D 7/06*** | (2006.01) |

(52) U.S. Cl.
CPC ................ *B64G 1/16* (2013.01); *B60G 3/00* (2013.01); *B62D 5/0418* (2013.01); *B62D 7/06* (2013.01)

(58) Field of Classification Search
CPC ....... B60G 2200/144; B64G 1/16; B62D 7/06
USPC .......................................................... 180/508
See application file for complete search history.

(56) References Cited

U.S. PATENT DOCUMENTS 6,585,276 B2 * 7/2003 Boucquey .............. B60G 11/27 280/124.135
9,957,002 B2 * 5/2018 Klassen ................ B60F 3/0007
11,192,414 B1 * 12/2021 Berardi .................. B62K 25/24
11,712,964 B1 * 8/2023 Drach .................. B60K 7/0007 180/245
2003/0164255 A1 * 9/2003 Borroni-Bird ......... B62D 21/00 180/54.1
2006/0151968 A1 * 7/2006 Kim ......................... B60G 7/02 280/86.757

(Continued)

FOREIGN PATENT DOCUMENTS

CN 105383582 A * 3/2016 ........... B62D 57/024
EP 1980424 A2 * 10/2008 ............. B60G 7/006
GB 2607127 A * 11/2022 ............. B62D 61/12

OTHER PUBLICATIONS

Merged original document with paragraphs added for citation purposes (GB 2607127). (Year: 2025).*

*Primary Examiner* — John Olszewski
*Assistant Examiner* — Nathaniel William Watkins
(74) *Attorney, Agent, or Firm* — Pearl Cohen LLP

(57) ABSTRACT

A rover includes a suspension configured to traverse uneven and unpredictable terrain, such as for example on an astronomical body. Each wheel is independently suspended off of the rover chassis with a linkage assembly comprising a pair of canted links which are able to continuously rotate relative to each other without collision or interference. The links allow the rover to independently adjust the height of each wheel relative to the chassis to drive over difficult terrain, and further allow the linkage assembly at each wheel to rotate 360° to effectively step or walk over particularly difficult terrain.

29 Claims, 14 Drawing Sheets

(56) References Cited

U.S. PATENT DOCUMENTS

| | | | | |
|---|---|---|---|---|
| 2006/0169518 | A1 * | 8/2006 | Thomas .................. | F16F 1/387<br>280/788 |
| 2010/0116572 | A1 * | 5/2010 | Schmitt .................. | B62D 9/002<br>701/22 |
| 2023/0249601 | A1 * | 8/2023 | Matthews ............. | E02F 3/7609<br>180/204 |

* cited by examiner 114
102
110
110
124
104
112
Yaw axis
z
x
Roll axis 130
110
114

134
132
θ
102
120
104
124
112
122

150
154
100
104

100

106
102
156
104
150

100

106
102
104
150

CONTINUOUS ROTATION ROVER SUSPENSION WITH CONSTANT VERTICAL STEERING AXIS

PRIORITY DATA

The present application claims priority to U.S. Provisional Patent Application No. 63/319,687, filed on Mar. 14, 2022, entitled "CONTINUOUS ROTATION ROVER SUSPENSION WITH CONSTANT VERTICAL STEERING AXIS", which application is incorporated by reference herein in its entirety.

BACKGROUND

Special purpose vehicles called rovers have been developed for surface exploration of astronomical bodies such as our moon, asteroids and other planets. Rovers are typically tasked with landing on an astronomical body via a spacecraft and then performing various tasks, including transport of spaceflight crew, collection of information about the environment, and to capture samples from the terrain. Given the uneven and generally unpredictable nature of the terrain over which rovers need to travel, rovers have been equipped with special drive and suspension systems configured to traverse difficult terrain. Such systems have met with limited success and occasionally a rover gets stuck, ending its mission. One useful tool known for celestial rovers as well as Earth-based vehicles is to provide adjustable-height, independent suspension of the vehicle's four wheels. However, known adjustable-height, independent suspensions are complex and still have limitations.

SUMMARY

In one aspect, the present disclosure relates to a rover including a suspension configured to traverse uneven and unpredictable terrain, such as for example on an astronomical body. Each wheel is independently suspended off of the rover chassis with a linkage assembly including a pair of canted links which are able to continuously rotate relative to each other without collision or interference. The links allow the rover to independently adjust the height of each wheel relative to the chassis to drive over difficult terrain, and further allow the linkage assembly at each wheel to rotate 360° to effectively step or walk over particularly difficult terrain. The links are affixed to a steering actuator at each wheel and the links maintain the steering actuators in a vertical orientation. This enables a rotational axis of the wheels to stay horizontal and keeps the wheels in uniform contact with a surface while steering around on the surface.

In one aspect, the present technology relates to a rover configured to advance over a surface, comprising: a chassis; a plurality of wheels; and a linkage assembly associated with each of the plurality of wheels coupling the plurality of wheel to the chassis, the linkage assembly associated with each of the plurality of wheels comprising a four-bar linkage comprising: a first link having a first end mounted at a first point on the chassis, and a second end mounted to one of an actuator and a strut adjacent a wheel of the plurality of wheels; a second link having a third end mounted at a second point on the chassis vertically below the first point, and a fourth end mounted to the one of the actuator and the strut adjacent the wheel of the plurality of wheels.

In another aspect, the present technology relates to a rover configured to advance over a surface, comprising: a chassis; a plurality of wheels; and a plurality of linkage assemblies, a linkage assembly of the plurality of linkage assemblies associated with each of the plurality of wheels to couple the plurality of wheel to the chassis, each wheel having a linkage assembly of the plurality of linkage assemblies to couple the plurality of wheel to the chassis, and each of the plurality of linkage assemblies configured to rotate in continuous 360° circles, the linkage assembly associated with each of the plurality of wheels comprising: a first link having a first end mounted at a first point on the chassis, and a second end mounted to one of an actuator and a strut at a wheel of the plurality of wheels; a second link having a third end mounted at a second point on the chassis vertically below the first point, and a fourth end mounted to the one of the actuator and the strut at the wheel of the plurality of wheels.

In a still further aspect, the present technology relates to a rover configured to advance over a surface, comprising: a chassis; a plurality of wheels; and a plurality of linkage assemblies, each wheel having a linkage assembly of the plurality of linkage assemblies to couple the plurality of wheel to the chassis, the linkage assembly associated with each of the plurality of wheels comprising: a first link having a first end mounted at a first point on the chassis and a second point adjacent a wheel of the plurality of wheels; a second link having a third end mounted at a third point on the chassis vertically below the first point, and a fourth end mounted to a fourth point adjacent the wheel of the plurality of wheels; wherein the plurality of linkage assemblies are configured to operate in a plurality of modes, comprising: a first mode where the plurality of wheels are driven to propel the rover over the surface, the plurality of linkage assemblies configured to adjust a height of each wheel independently relative to the chassis to account for uneven terrain on the surface in the first mode; and a second mode where the plurality of wheels walk over the surface, the plurality of linkage assemblies configured to rotate the wheels through 360° in the second mode.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate the same or similar elements.

DETAILED DESCRIPTION

Figure 1:
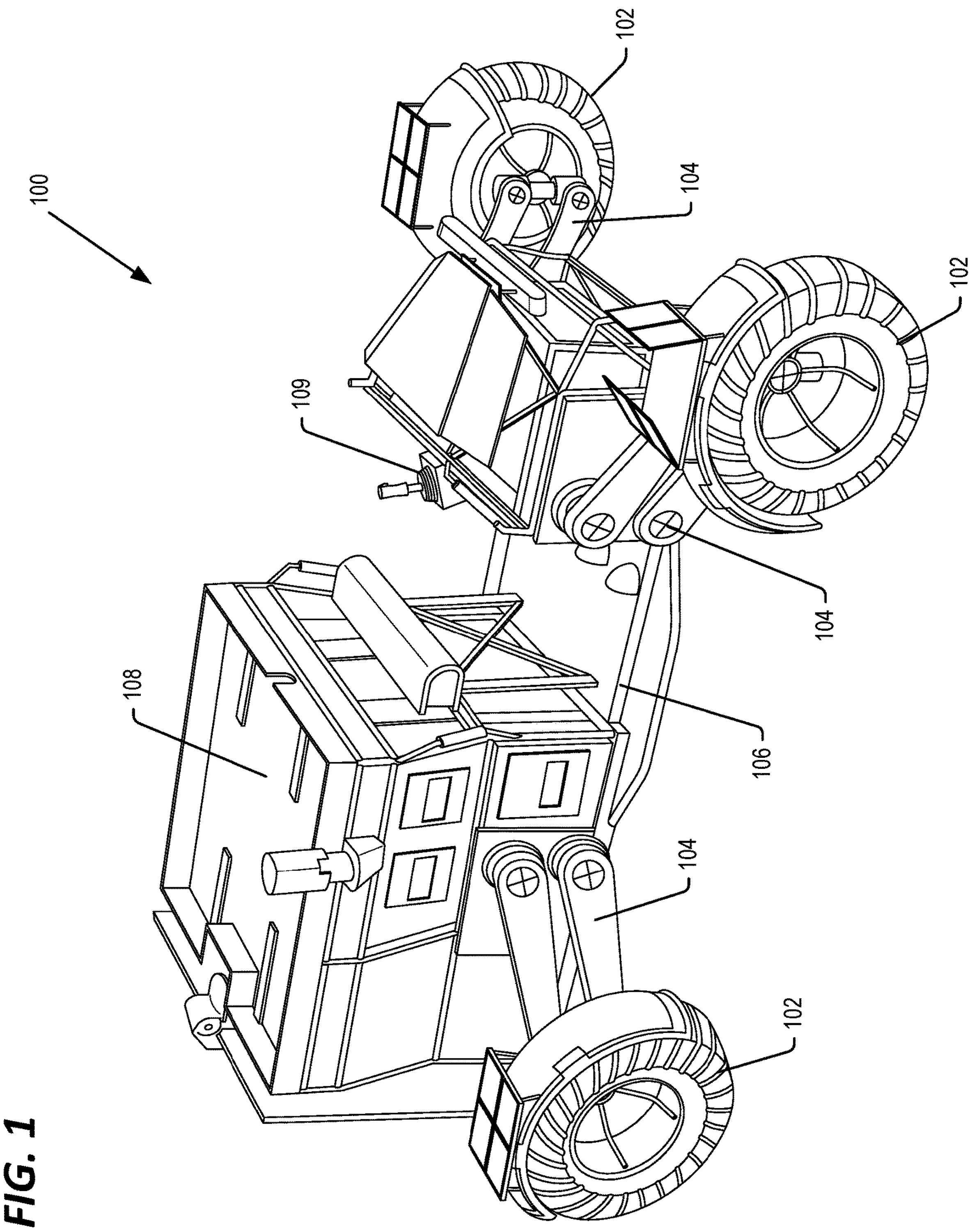
FIG. 1 is a perspective view of a rover including a suspension according to embodiments of the present technology.

In one aspect, technology is described for a rover including a suspension configured to traverse uneven and unpredictable terrain. Each wheel is independently suspended off of the rover chassis with a linkage assembly comprising a pair of links, mounted at a canted angle off of the chassis. The cant angle is provided to allow the links to continuously rotate relative to each other without collision or interference. The canted links are affixed to a plate on the rover chassis at two vertically aligned points, and to a steering actuator on the wheel side at two vertically aligned points. This assembly forms a four-bar linkage which provides several advantages. For example, the linkage assemblies provide a simple yet effective independently adjustable suspension at each wheel. Moreover, the linkage assemblies are able to maintain the steering actuators, to which the links are affixed at each wheel, in a vertical orientation which allows the wheels to turn while staying in uniform contact with the ground. Further still, the links are affixed to plates at the chassis side, and the steering actuators at the wheel side, in a way that allows rotation of the links but simple translation (and no rotation) of the plates and steering actuators. One benefit of this is that electrical connections may be made to the steering and other actuators in the wheel without a slip ring or other complicated fixtures.

The ability of the canted links to continuously rotate relative to each other without collision or interference also enables several modes of use. In a first mode of use, the wheels may be suspended upward off the ground with the chassis resting on the ground. This mode is useful to stow or park the rover and is also useful to present the wheels and suspension to a robotic arm for maintenance or repair of the wheels or suspension. In a second mode of use, the suspension may support the chassis off of the ground as the rover drives around its environment. The independent, vertical adjustment of each wheel by the linkage assemblies allows the rover to navigate uneven terrain in the second mode with each wheel maintaining uniform contact with the surface and equally distributing the load of the rover between each wheel. In a third mode of use, each linkage assembly may rotate 360° (or some fraction of a full circle), one at a time, to step or walk the rover over particularly uneven rugged terrain.

The rover including the linkage assemblies of the present technology provides advantages to rover travel on astronomical bodies such as our moon, asteroids and other planets. However, in further embodiments, the linkage assemblies of the present technology may be incorporated within in Earth-based vehicles advantageously used to navigate rugged Earth terrains. It may also advantageously be used at disaster sites after natural or man-made disasters, where rough terrain, ruble and other debris may make travel by traditional vehicles difficult.

It is understood that the present technology may be embodied in many different forms and should not be construed as being limited to the embodiments set forth herein. Rather, these embodiments are provided so that this disclosure will be thorough and complete and will fully convey the technology to those skilled in the art. Indeed, the technology is intended to cover alternatives, modifications and equivalents of these embodiments, which are included within the scope and spirit of the technology as defined by the appended claims. Furthermore, in the following detailed description of the present technology, numerous specific details are set forth in order to provide a thorough understanding of the present technology. However, it will be clear to those of ordinary skill in the art that the present technology may be practiced without such specific details.

The terms “longitudinal” and “transverse,” “top” and “bottom,” “upper” and “lower” and “vertical” and “horizontal,” and forms and synonyms thereof, as may be used herein are by way of example and illustrative purposes only, and are not meant to limit the description of the technology inasmuch as the referenced item can be exchanged in position and orientation.

For purposes of this disclosure, a connection may be a direct connection or an indirect connection (e.g., via one or more other parts). In some cases, when a first element is referred to as being connected, affixed, mounted or coupled to a second element, the first and second elements may be directly connected, affixed, mounted or coupled to each other or indirectly connected, affixed, mounted or coupled to each other. When a first element is referred to as being directly connected, affixed, mounted or coupled to a second element, then there are no intervening elements between the first and second elements (other than possibly an adhesive or melted metal used to connect, affix, mount or couple the first and second elements).

FIG. 1 is a perspective view of a rover 100 including four wheels 102, each affixed to the rover 100 by a suspension comprised of linkage assemblies 104 according to the present technology (three of which are visible and numbered in FIG. 1). The rover 100 includes a frame or chassis 106 to which the wheel suspension is affixed. It is understood that the rover 100 may be any of a wide variety of vehicles used for travel and/or exploration, for example of and around astronomical bodies. The rover 100 may include a payload 108, though it need not in further embodiments. The rover may be manned or unmanned. For manned travel, the rover 100 may include navigation controls 109 which for example control the steering and speed of the rover 100. Where the rover 100 is controlled remotely for unmanned travel, the navigation controls 109 may be omitted. While the rover 100 is shown having four wheels 102, the rover 100 may include four wheels, less than four wheels or more than four wheels in further embodiments, where one or more of the wheels is supported by a linkage assembly 104 according to embodiments of the present technology.

Figure 2:
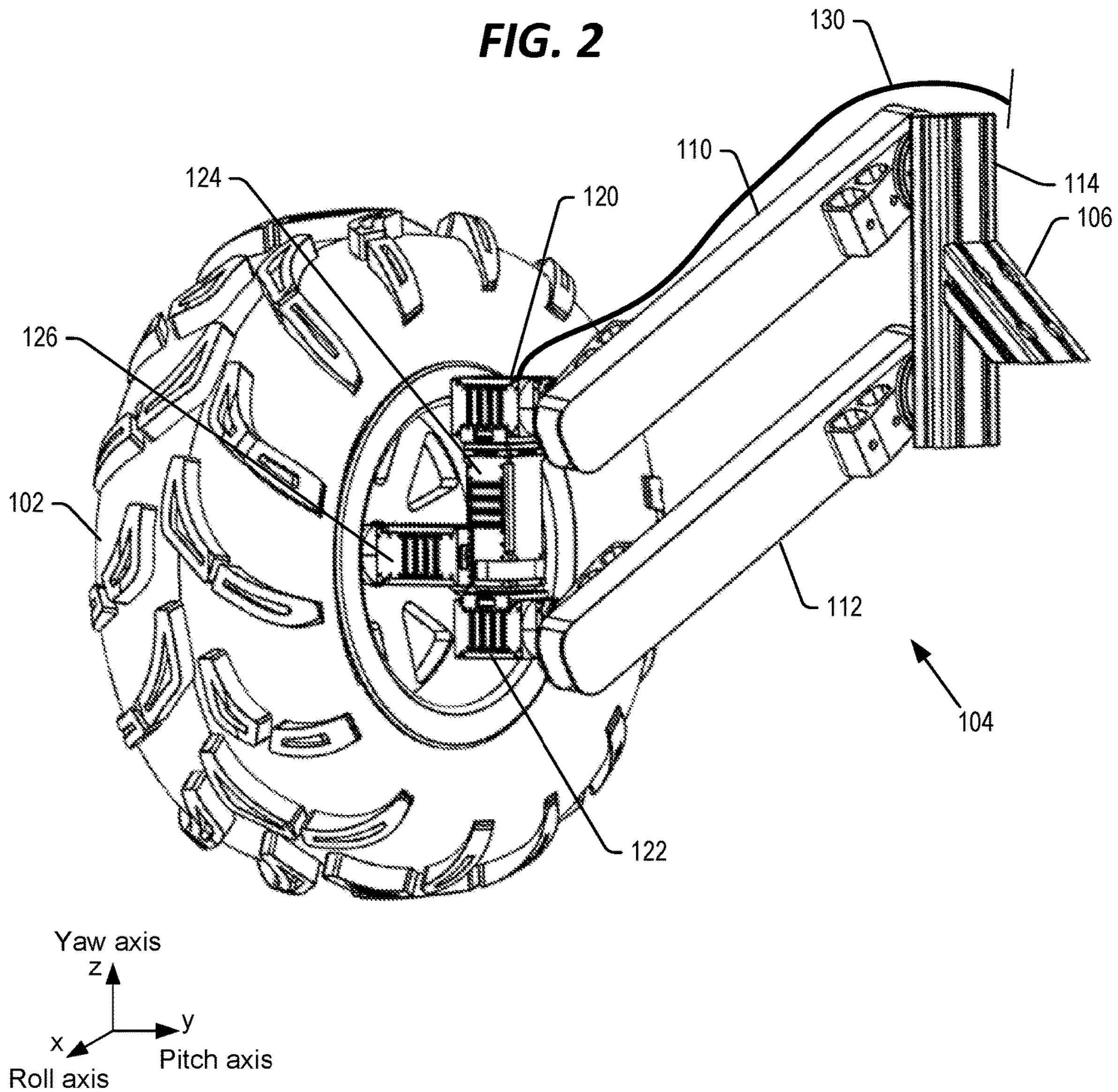
FIG. 2 is a perspective view of a wheel and linkage assembly according to embodiments of the present technology.
Figure 3:
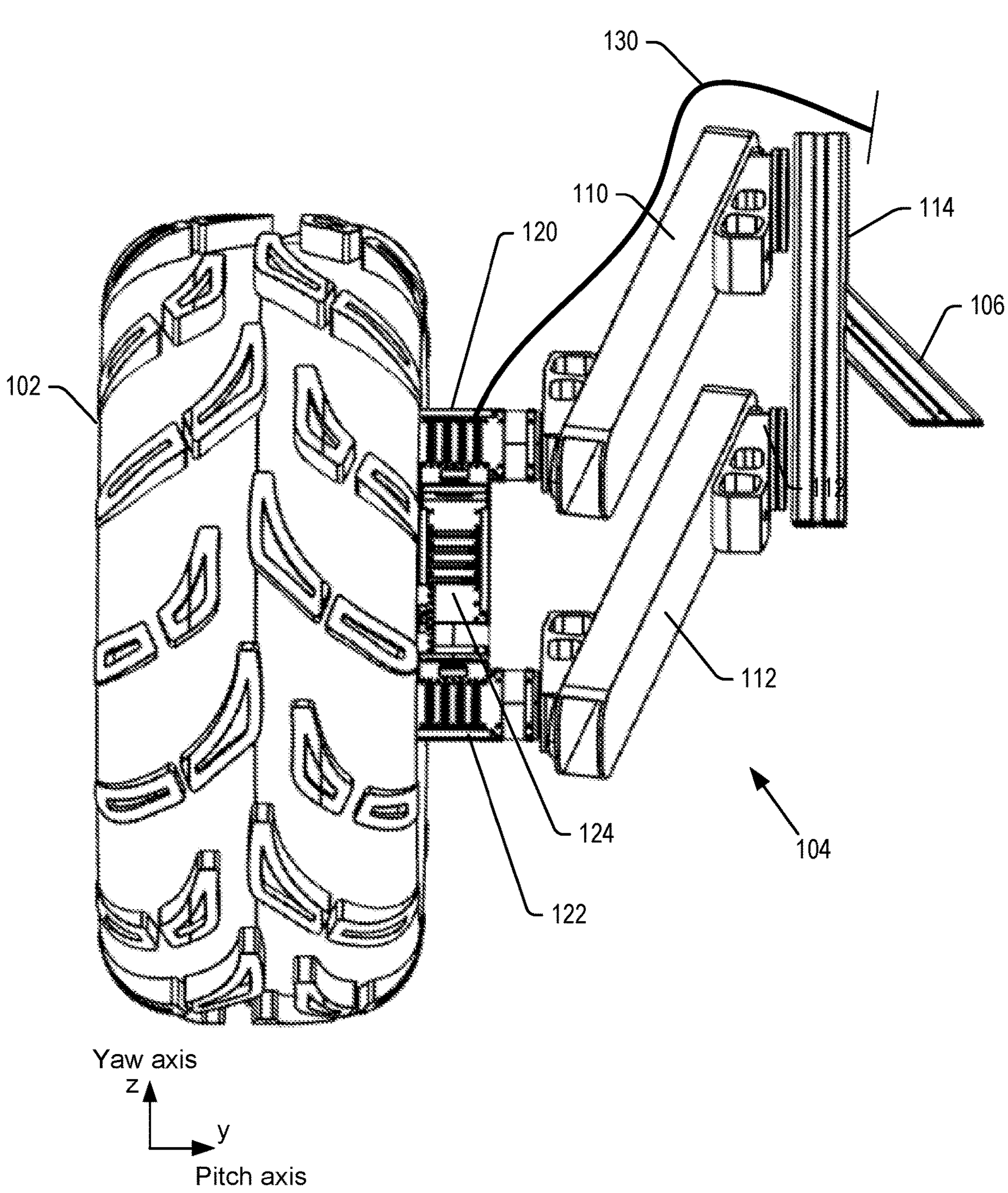
FIG. 3 is an end view of a wheel and linkage assembly according to embodiments of the present technology.
Figure 4:
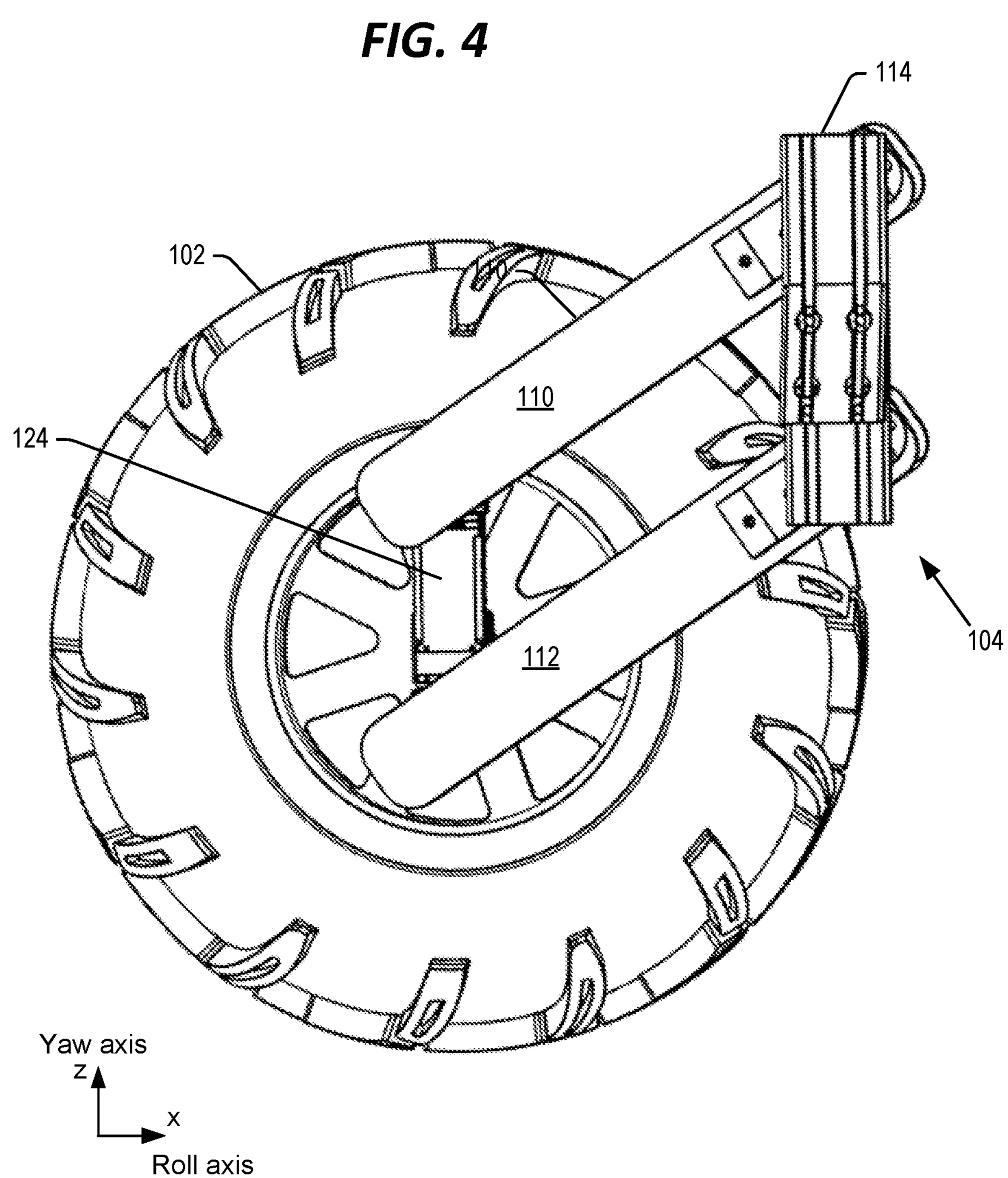
FIG. 4 is a side view of a wheel and linkage assembly according to embodiments of the present technology.

FIGS. 2-4 are perspective, end and side views, respectively, of a wheel 102 and a linkage assembly 104. While the description that follows is of a single linkage assembly 104, the description applies to each of the linkage assemblies 104 used in rover 100. A portion of the chassis 106 is shown, but the remainder of the rover 100 is omitted for clarity. The linkage assembly 104 includes a pair of links 110, 112, each affixed by rotational bearings at a first end to a plate 114 or other portion of the chassis 106. Plate 114 will typically be vertically oriented. That is, when rover 100 horizontal, the plate 114 will be vertical. The mounting points of the first and second links to plate 114 are vertically aligned with each other. Each link 110, 112 is affixed at its second and, opposite the first end, by rotational bearings to a pair of link actuators 120, 122. The link actuators 120, 122 are explained in greater detail below but are provided to drive rotation of the links 110 and 112 in unison.

The link actuators 120, 122 are mounted by rotational bearings at the top and bottom of a steering actuator 124, respectively. The steering actuator 124 includes a motor configured to rotate the steering actuator 124 relative to the top and bottom link actuators 120, 122 about the z-axis. In embodiments, just the front two wheels of rover 100 include steering actuators 124, which steering actuators are controlled by a computing system (described below with respect to FIG. 13) to rotate by the same amount, same speed and in the same direction. In further embodiments, all four wheels of the rover 100 may include steering actuators 124, with the front two steering actuators operating in unison with each other, and the rear two steering actuators operating in unison with each other and independently of the front two steering actuators. Whether rover 100 includes two or four steering actuators 124, the steering actuators 124 affect steering of the rover 100 about the z-axis (i.e., the yaw axis).

Rover 100 may further include a wheel actuator 126 at the front and/or rear wheels 102 which includes a motor for rotating the wheels 102 in either direction to accomplish forward and backward movement of the rover 100 along the x-axis. In embodiments, a wheel actuator 126 may be rotationally mounted by rotational bearings at a first end to the steering actuator 124, and may be fixedly mounted to the wheel 102 at its second and opposite the first end. In further embodiments, a wheel actuator 126 may be fixedly mounted to the steering actuator 124, and may receive a driveshaft rotationally mounted within the wheel actuator 126. In such embodiments, the driveshaft would be fixedly mounted to the wheel 102. The wheel actuator 126 may be mounted perpendicularly off the steering actuator 124.

As noted, in some embodiments, the steering actuator 124 may be omitted from the front or rear wheels. In such embodiments, a strut (not shown) may be substituted for the steering actuator, such that the strut is positioned between the top and bottom link actuators 120, and the wheel actuator 126 is mounted perpendicularly off of the strut. The computing system may control the motor of the wheel actuator 126 so that the two or more wheel actuators operate in unison, rotating the wheels 102 at the same speeds and in the same direction.

As explained in greater detail below, it is a feature of the linkage assembly 104 of the present technology to maintain the steering actuators 124 at each wheel 102 oriented along the vertical z-axis. This advantageously enables pure rotation of the wheels 102 about a horizontal axis (i.e., the y-axis or pitch axis). As described, all coupling mechanisms, steering and suspension are co-located together. Each linkage assembly 104 and actuators 120, 122, 124 and 126 may be implemented into the rover 100 as a single module to attach a wheel 102 to the chassis 106. In the same way, when performing repairs or upgrades, a linkage assembly 104 and actuators 120, 122, 124 and 126 may be removed from the rover as a single module. Batteries and/or processors may be added to the linkage assembly 104 and/or actuators 120, 122, 124 and 126 and be part of the single integrated module that is inserted and/or removed as a whole. A linkage assembly 104 and/or actuators 120, 122, 124 and 126 may be implemented or removed individually in further embodiments.

The links 110, 112 of a linkage assembly 104 are each mounted at their first ends to the vertical plate 114 with the mounting point of link 110 on plate 114 being vertically above the mounting point of link 112 on plate 114. The links 110, 112 of a linkage assembly 104 are each mounted at their second ends to the link actuators 120, 122 with the mounting point of link 110 to actuator 120 being vertically above the mounting point of link 112 to actuator 122. This arrangement forms a four-bar linkage including links 110, 112, plate 114 and link actuators mounted a fixed length from each other at the top and bottom of the steering actuator 124. Moreover, the links 110, 112 are mounted at a canted angle (θ in FIGS. 5-7) off of vertical plate 114.

Figure 5:
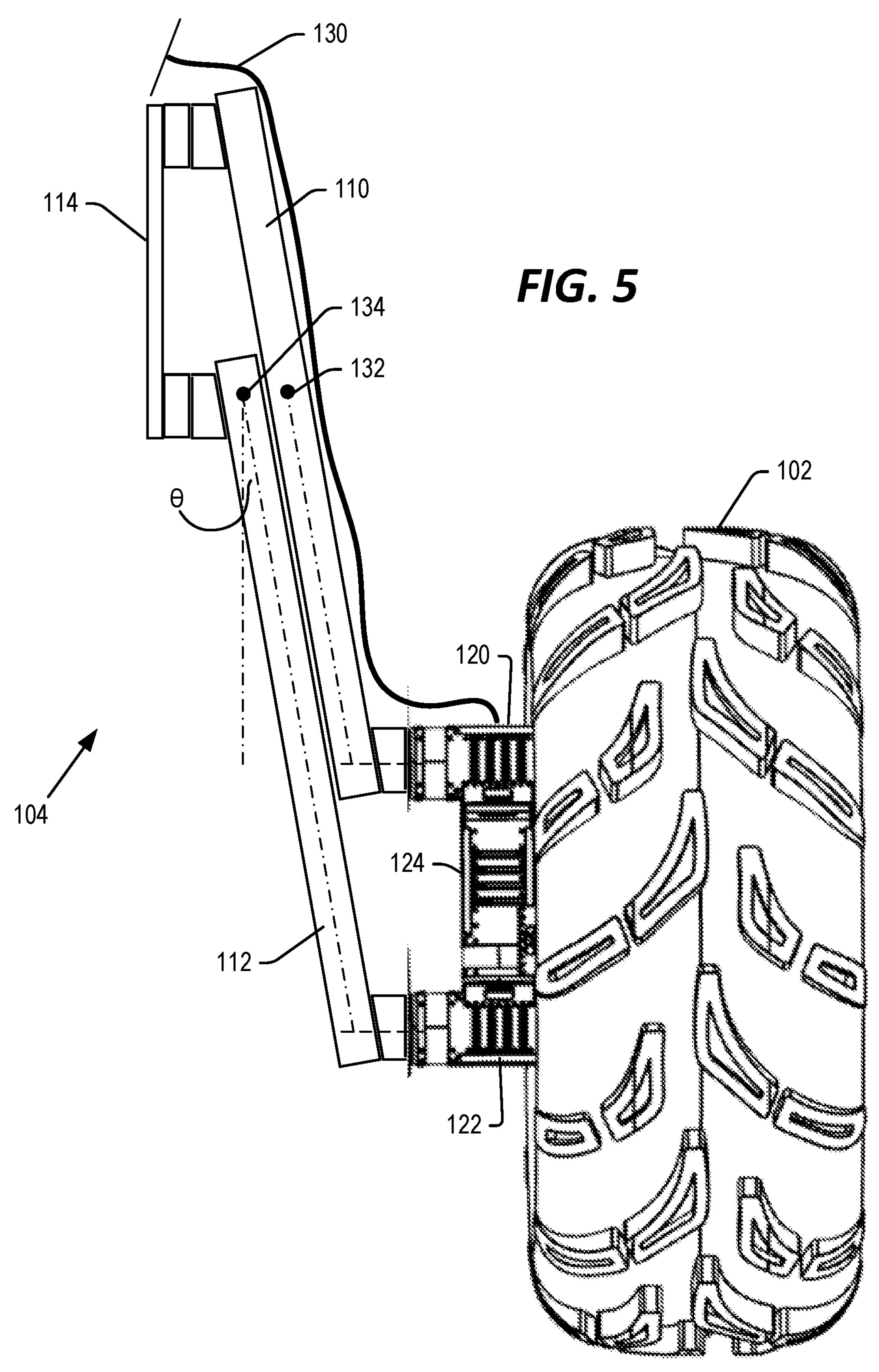
FIG. 5 is an end view of a wheel and linkage assembly at the bottom of its stroke according to embodiments of the present technology.
Figure 6:
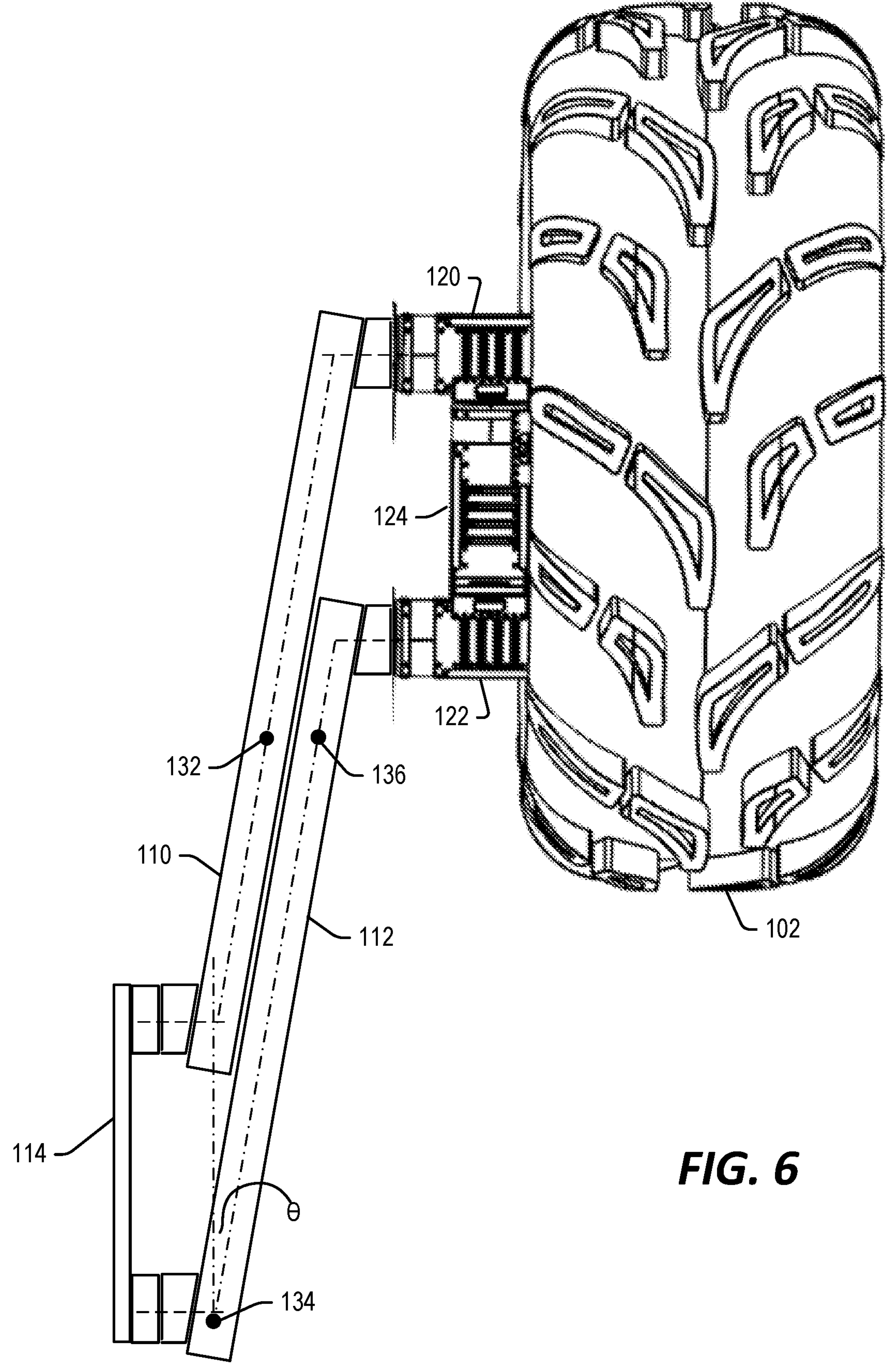
FIG. 6 is an end view of a wheel and linkage assembly at the top of its stroke according to embodiments of the present technology.
Figure 9:
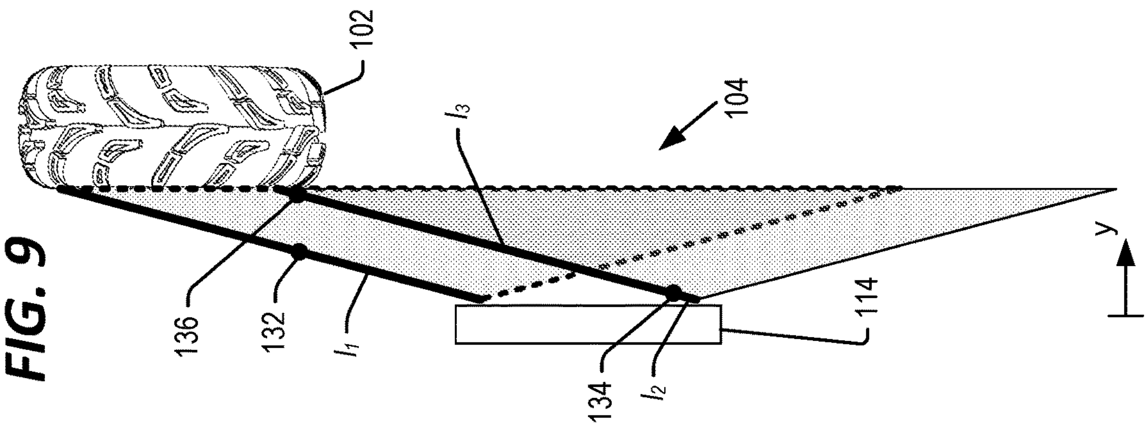
FIGS. 7-9 are schematic end views of the paths traced out by the links of the linkage assemblies according to embodiments of the present technology.
Figure 8:
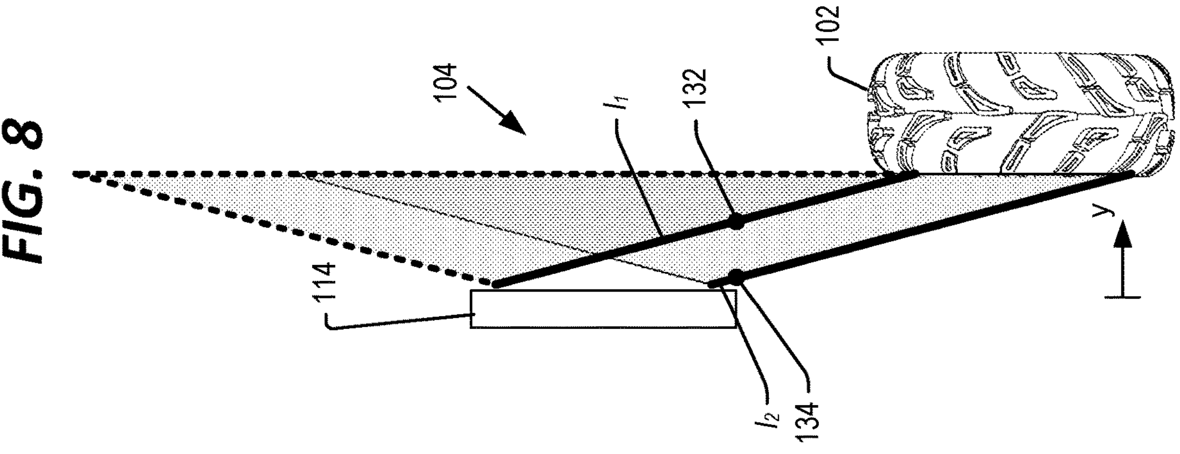
Figure 7:
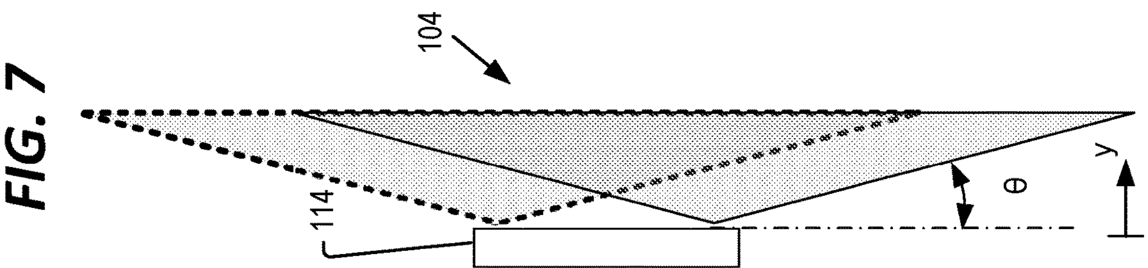

The canted, four-bar linkage of each linkage assembly 104 provides several advantages. First, the links 110 and 112 are able to rotate through 360° (or a portion of a circle), raising and lowering the elevation of the attached wheel 102 relative to the chassis 106, without colliding or interfering with each other. FIGS. 5 and 6 are end views of the linkage assembly 104 affixed to a wheel 102 at two different points during the rotation of the linkage assembly, and FIGS. 7-9 are schematic representations showing the conical path traced out by rotation of a linkage assembly 104. FIG. 5 shows a view of links 110, 112 at a bottom of their stroke, pointed straight downward. As explained below, the linkage assembly 104 may be in this position while the rover 100 is driving and steering around on terrain. In FIG. 6, the links 110, 112 have been rotated 180° by the linkage actuators 120, 122 to the top of their stroke, pointed straight upward. As explained below, the linkage assembly 104 may be in this position to stow the rover 100, or while stepping or walking the rover 100 over particularly rugged terrain.

While the second ends of each of the links 110, 112 is shown rotationally coupled to a linkage actuator 120, 122 adjacent a wheel 102, the second ends of one or both links 110, 112 may instead be rotationally connected to a rigid strut, which is in turn coupled to the linkage actuators for rotating the linkage assembly. In a further embodiment, one or both linkage actuators may be positioned at the opposite (first) ends of links 110, 112, between the links 110 and/or 112 and plate 114. In such embodiments, the links 110 and/or 112 may be rotationally affixed to a strut or the steering actuator at their second ends.

As noted, the linkage assembly may comprise a pair of linkage actuators 120, 122. It is conceivable that the linkage assembly be rotated between the positions shown in FIGS. 5 and 6 using a single linkage actuator, on either the top or bottom of the steering actuator 124. However, when the links are vertically aligned (either at the bottom of their stroke in FIG. 5 or the top of their stroke in FIG. 6) there is a singularity condition where continued motion is indeterminate, depending for example on the existing momentum of the links. In such a condition, it is possible that the links rotate in opposite directions and get out of alignment. Providing a pair of linkage actuators, one driving link 110 and one driving link 112, prevents the possibility of a singularity condition and ensures both links rotate together in unison, i.e., at the same angular positions at all times. In addition to or instead of having two linkage actuators, the problem of indeterminate motion may be solved by further a timing belt or gear to tied to one of the linkage actuators. Another option is to add an additional kinematic linkage between the linkage actuators 120, 122 to force the links to maintain their alignment.

Providing the links 110, 112 at a canted angle enables continuous rotation of the links together without their colliding or interfering with each other. FIG. 7 shows a schematic end view of the conical path traced by each link 110, 112 as a result of the cant angle θ. The conical path of the upper link 110 is shown in dashed lines to distinguish it from the conical path of the lower link 112. Although not necessarily intuitive, when at the bottom of its stroke as shown in FIGS. 5 and 8, the upper link 110 rotates outwardly of link 112 (i.e., link 110 is in front of link 112 from a front view), and when at the top of its stroke as shown in FIGS. 6 and 9, the lower link 112 rotates outwardly of link 110. This can be seen from the trigonometric relationship of the links 110, 112. For example, taking any point on links 110, 112 which is a length, l, away from the link mounting point on plate 114, the distance of the point away from plate 114 along the y-axis will be:

$$l*\sin(\theta).$$

For 0<θ≤90° (as it will be), then the larger the length l, the farther away the point will be away from the plate 114 along the y-axis.

Thus, at the bottom of its stroke shown in FIGS. 5 and 8, a point 132 at a length $l_1$ along link 110 will be further away from plate 114 along the y-axis than an equal elevation point 134 at length $l_2$ along link 112, where $l_1$ is greater than $l_2$. Conversely, at the top of its stroke shown in FIGS. 6 and 9, the same point 132 at the length $l_1$ along link 110 will be closer to the plate 114 along the y-axis than an equal elevation point 136 at length $l_3$ along link 112, where $l_1$ is less than $l_3$.

Accordingly, the angle θ, the thicknesses of links 110, 112, and the vertical offset of their mounting points on plate 114 can all be selected such that the links can continuously rotate about 360°, or any angle, without collision or interference. Each of these values may vary in different embodiments, but in one embodiment, the angle θ may be between 5° and 45°, the thicknesses of links 110, 112 may each be between 1 and 2 inches, and the vertical offset of their mounting points on plate 114 may be between 8 to 12 inches. Values may be selected within these ranges that allows clearance between the links 110 and 112 as they rotate above and below each other. It is understood that each of the angle θ, the thicknesses of links 110, 112, and the vertical offset of their mounting points on plate 114 may vary outside of these ranges in further embodiments.

In one example, the links 110, 112 may be 16 to 20 inches in length, though they may be shorter or longer than that in further embodiments. The links 110, 112 may be made of aerospace-grade materials including Aluminum and Titanium, though they may be made of other materials in further embodiments. The links may be made with a hollow cross-section, with a wall thickness of 0.25 to 0.5 inches, as hollow links provide a better strength to weight ratio than filled in links. However, the links may have wall thicknesses above or below this range, and the links may be filled in, in further embodiments. In one embodiment, the links and the various other parameters of the system may be selected so that each linkage assembly 104 is designed to withstand loads up to 1600 kg, though a linkage assembly 104 may be built to withstand greater or lesser loads.

It is a further advantage of the canted linkage assembly 104 that, since each link 110, 112 is the same length, the four-bar linkage maintains the steering actuator parallel to the plate 114, i.e., vertically oriented. It is a problem with single-strut suspension assemblies of the prior art that the single strut does not maintain the steering actuator vertical. As a result, when steering and changing the heading of the rover, the wheel does not simply change its pitch axis, but rather it causes the axis of rotation of the wheel to wobble, lifting and dropping the vehicle as the wheel turns. This becomes more significant the more the suspension adjusts the vertical position of the wheel relative the rover chassis.

This problem is solved by the four-bar linkage of the present technology. The four-bar linkage maintains the steering actuator 124 vertical (parallel to the plate 114) as the heading of the rover changes and as the vertical height of the wheel 102 changes relative to the chassis 106 (as explained above and below). By maintaining the steering actuator 124 vertical, the axis of rotation of the wheel stays constant and the wheel rotates while staying in uniform contact with the ground over which the rover 100 is travelling.

A further advantage of forming each linkage assembly 104 of four-bar linkages is that while the links 110, 112 rotate, the plates 114 and steering actuator 124 do not. Treating the plate 114 as stationary, the links 110, 112 will translate the linkage actuators 120, 122 and steering actuator 124 as the links 110, 112 rotate, but these actuators will not themselves rotate. That is, as the links translate the actuators around in a circular path, the actuators themselves maintain a constant rotational orientation. This is significant for a few reasons. First, it maintains the steering actuator 124 in a vertical orientation as the links 110, 112 rotate, which is important as explained above. Moreover, there are power and control lines that travel from the rover to the actuators at the wheel 102. In prior art designs, a slip ring, rotating with the wheel, was used to enable power and control lines to be connected at the wheel without twisting the lines as suspension rotated.

This problem is solved by the four-bar linkage of the present technology. As the linkage and steering actuators maintain their vertical orientation as they are translated by links 110, electrical lines 130 (one such line being shown in FIGS. 2, 3 and 5 but omitted from other figures for clarity) may travel from a connection point on the rover (not shown) to the actuators 120, 122, 124 without twisting and without the need for a slip ring. This type of connection, including the omission of the slip ring, reduces the complexity of the suspension and increases the reliability of the suspension and electrical cabling as compared to prior art designs.

Figure 10:
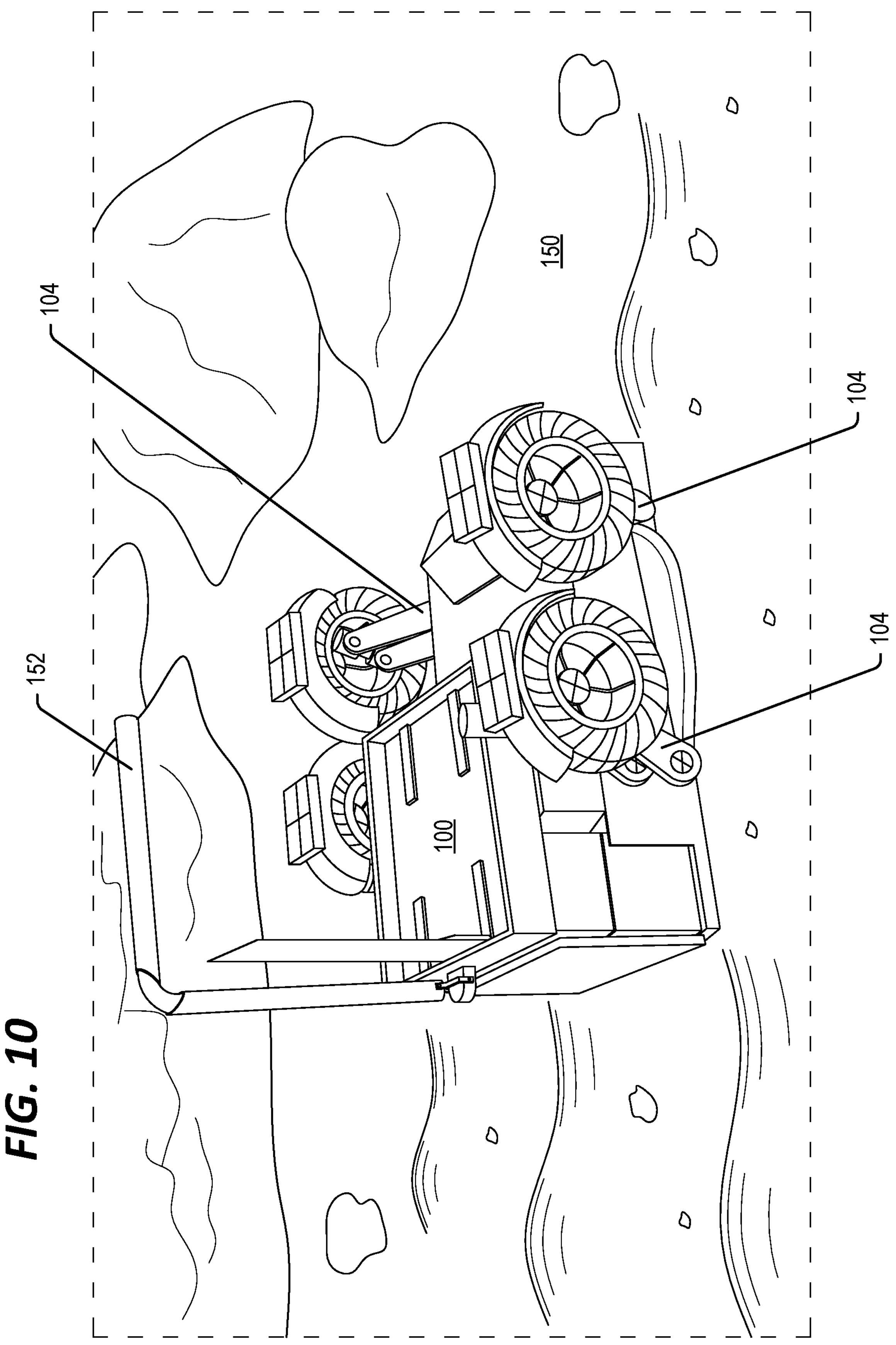
FIG. 10 is a perspective view showing a rover and suspension in a first, stowed mode of operation according to embodiments of the present technology.

The linkage assemblies 104 enable several use cases for rover 100. Referring initially to FIG. 10, there is shown a use case of the rover 100 where the linkage assemblies 104 are rotated upward at or near the top of their stroke, such as for example as shown in FIG. 6. In this position, the chassis 106 of rover 100 rests on a surface 150, which in this example can be the surface of the moon, an asteroid, another planet or other surface. In this position, the rover 100 is parked or stowed such that it cannot roll away on the wheels 102. Additionally, in their upward position as shown, the wheels 102 and linkage assemblies 104 are accessible to a robotic arm 152 for maintenance or repairs. A further advantage to this use case is compact stowage for launch and delivery to the surface. The wheels-up use case also provides thermal protection to the rover. Upon activation, signals may be sent to the linkage actuators 120, 122 at each of the four wheels 102 to rotate the linkage assemblies and wheels downward until the wheels touch the surface 150 and elevate the chassis 106 off the surface. Thereafter, the linkage assemblies 104 and wheels 102 may be used to propel and steer the rover 100 in a driving mode described below.

Figure 11:
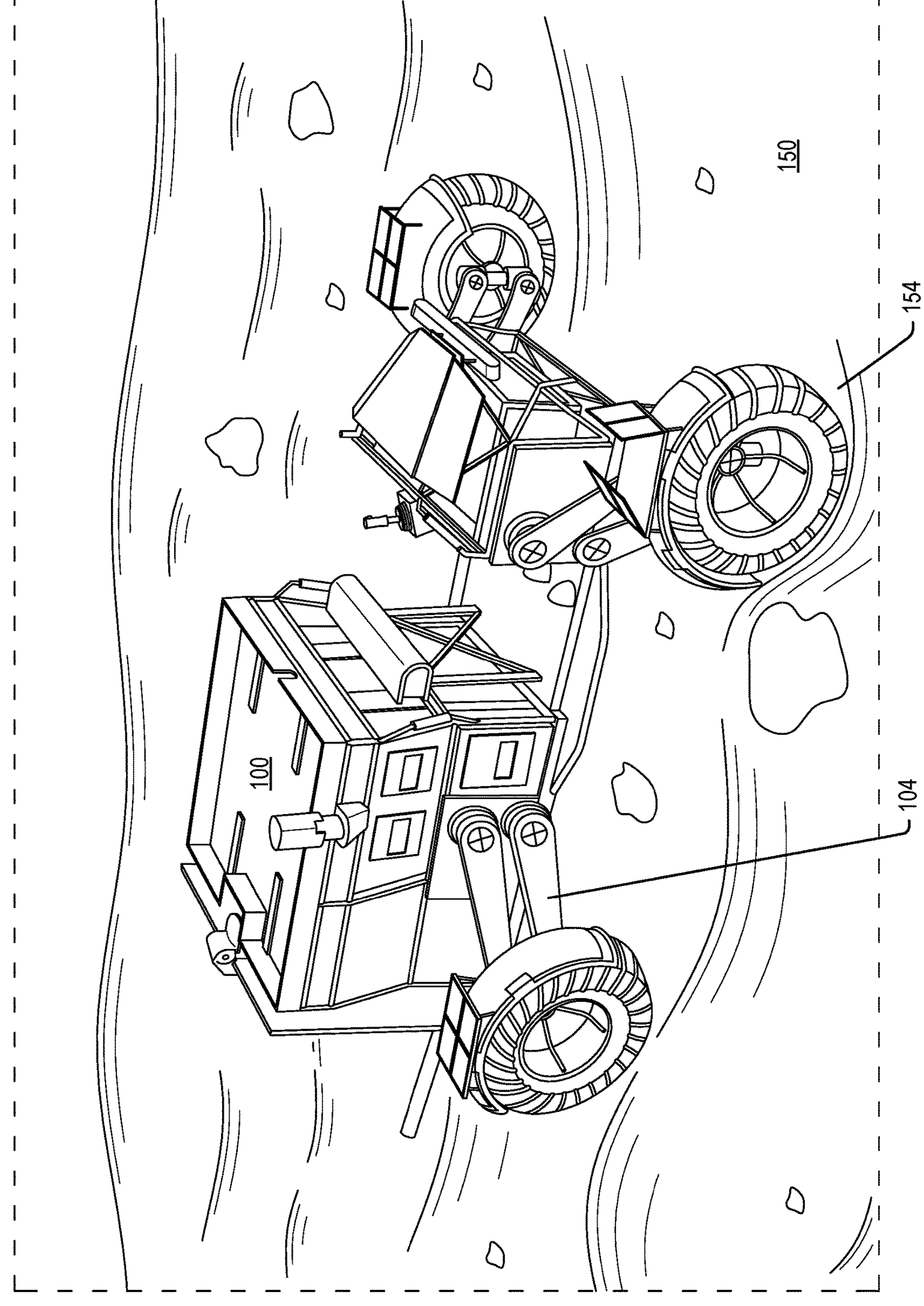
FIG. 11 is a perspective view showing a rover and suspension in a second, driving mode of operation according to embodiments of the present technology.

A further use case of a driving mode of operation will now be explained with reference to the illustration of FIG. 11. Here, the rover drives forward (or backward) while the linkage assemblies 104 are used as independent suspensions to maintain the chassis 106 off the ground and horizontal (i.e., orthogonal to gravity) as the rover traverses uneven terrain. As seen, the linkage assemblies 104 may be operated independently of each other to adjust for uneven terrain at each of the four wheels. Thus, for example, when the front right wheel encompasses a recess 154 in the terrain 150, the computing system can actuate the linkage assembly at the front right wheel to rotate the wheel downward toward the bottom of its stroke to maintain the chassis horizontal and to maintain uniform contact and traction of each wheel with the surface 150.

In order to anticipate and respond to uneven terrain over which the rover is to pass or is passing, sensors such as cameras, radar, sonar and lidar may measure the terrain over which each wheel is to pass. Signals may also be generated by position sensors on the wheels or linkage actuators. These signals are sent to the computing system, which computes an appropriate elevational position of each wheel in response to the sensed terrain contour to maintain each wheel in uniform contact with the surface 150. The computing system thereupon sends signals to the linkage actuators 120, 122 at each wheel 102 in real time to set the elevational height of each wheel at the appropriate height relative to the chassis 106.

The linkage assemblies 104 may further act as shock absorbers, where the linkage actuators 120, 122 at each wheel function as spring and damper to absorb and prevent shocks to the rover 100. As sensors in the rover (or a single wheel) sense a bump or recess, the computing system controls the linkage actuators 120, 122 of the associated linkage assemblies or assembly to adjust one or more of the linkage assemblies to maintain uniform contact with the terrain. Specifically, one or more of the linkage assemblies change the elevation of the wheel(s) to act as shock absorbers to handle changes in the terrains. The above-described sensors can provide a closed loop feedback system that sense and anticipate bumps and elevation of the wheel(s) are adjusted accordingly.

Figure 12A:
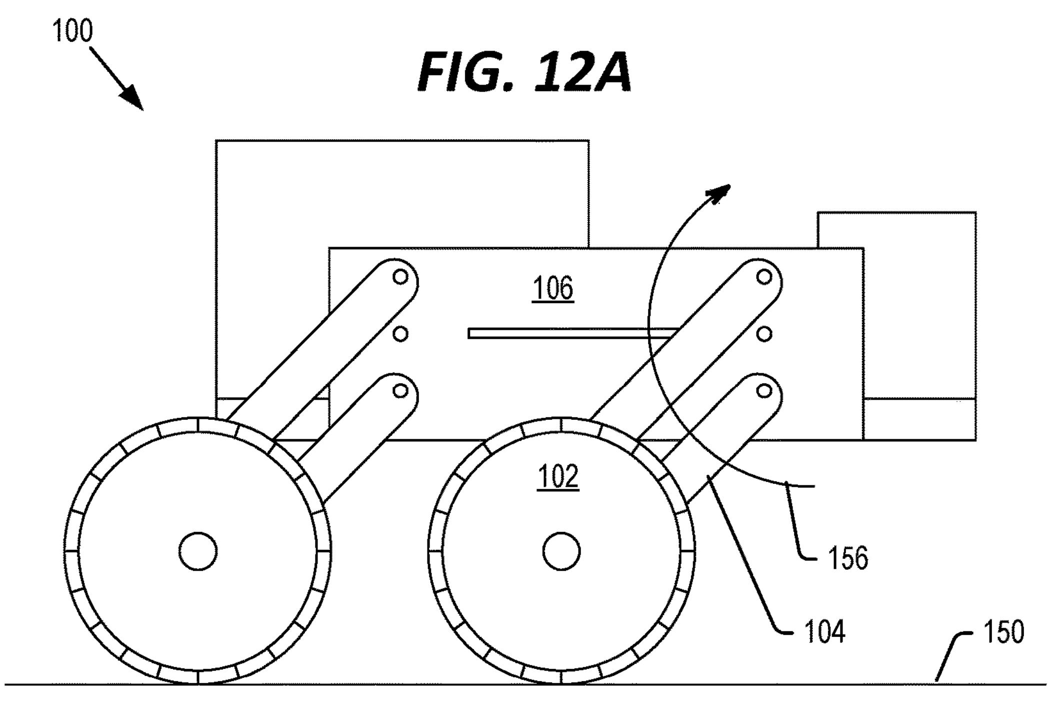
FIGS. 12A-12G are side views of a rover and suspension in third, walking mode according to embodiments of the present technology.
Figure 12B:
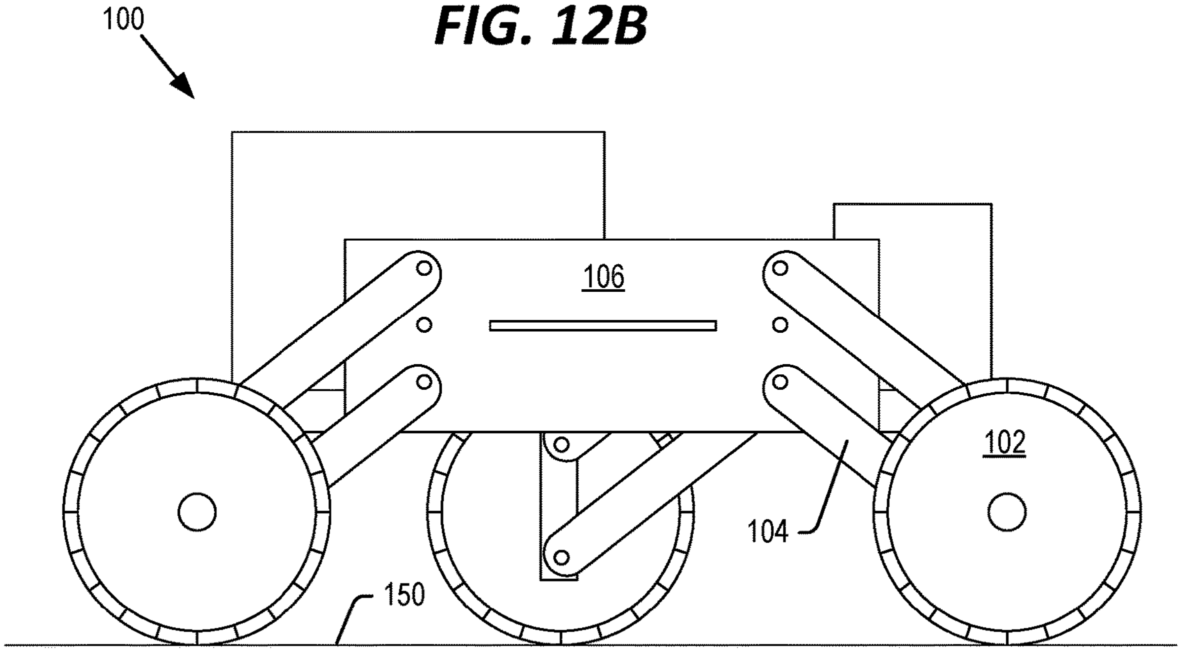
Figure 12C:
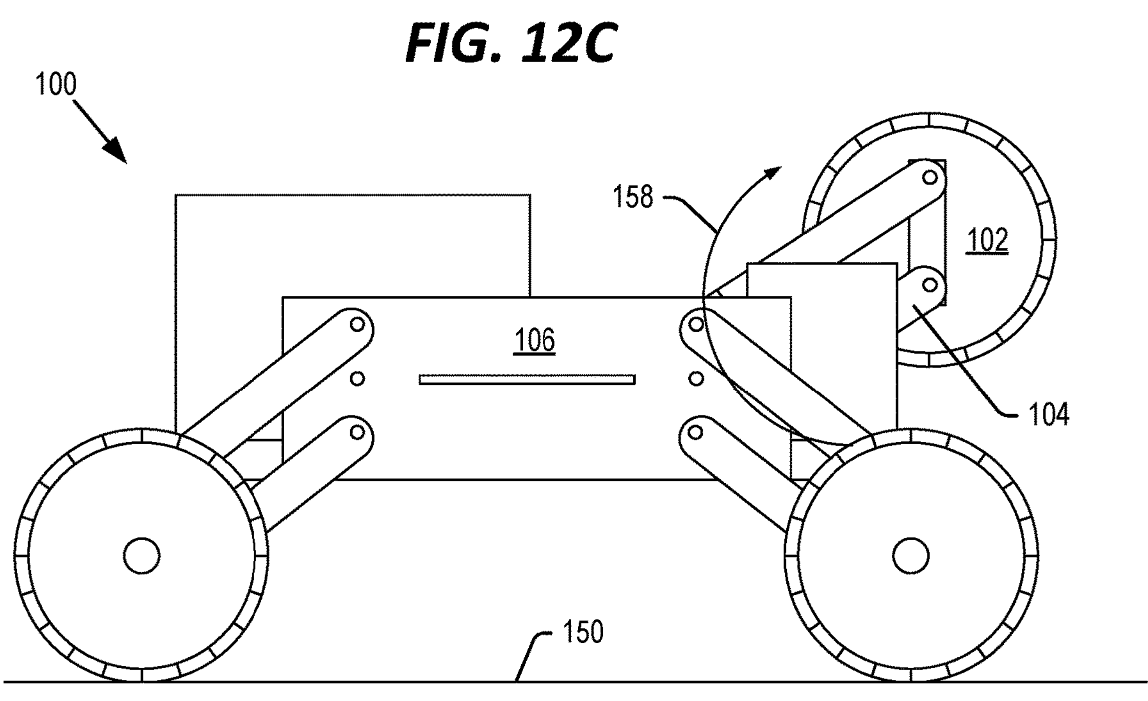

FIGS. 12A-12G illustrate in further use case of the present technology, where the linkage assemblies 104 provide a walking mode of operation for the rover 100 to walk or step over particularly rugged terrain or obstacles. This use case may for example be used when the rover 100 is unable to advance by simply rotating the wheels. This mode is also useful for extracting an embedded wheel or vehicle, increasing the forward draw-bar (pull/towing) force, or climbing steeper terrain than would otherwise be possible. This mode of operation may for example start as shown in FIG. 12A, when the chassis 106 is ahead of each of the wheels 102. As indicated by arrow 156, this mode of operation may begin rotating linkage assembly 104 associated with the front right wheel 102 to rotate the wheel to the position shown in FIG. 12B. Thereafter, the linkage assembly 104 associated with the front left wheel may rotate the front left wheel as indicated by the arrow 158 in FIG. 12C until the front left wheel is again on the ground in front of the chassis 106.

Figure 12D:
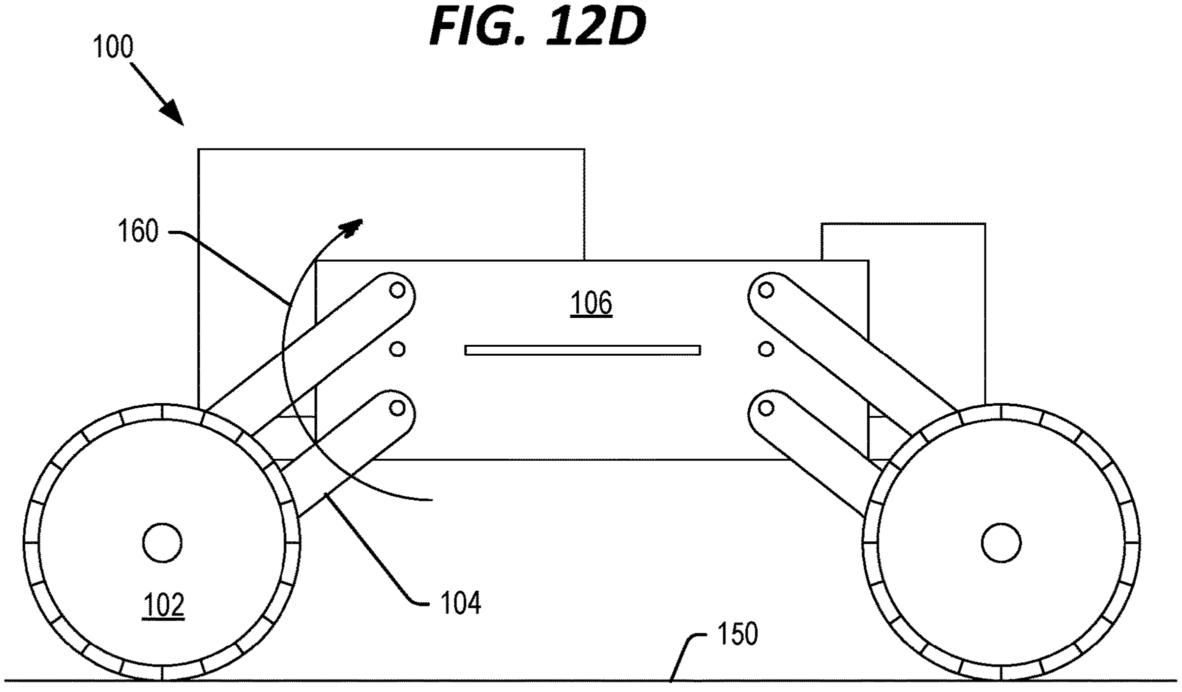
Figure 12E:
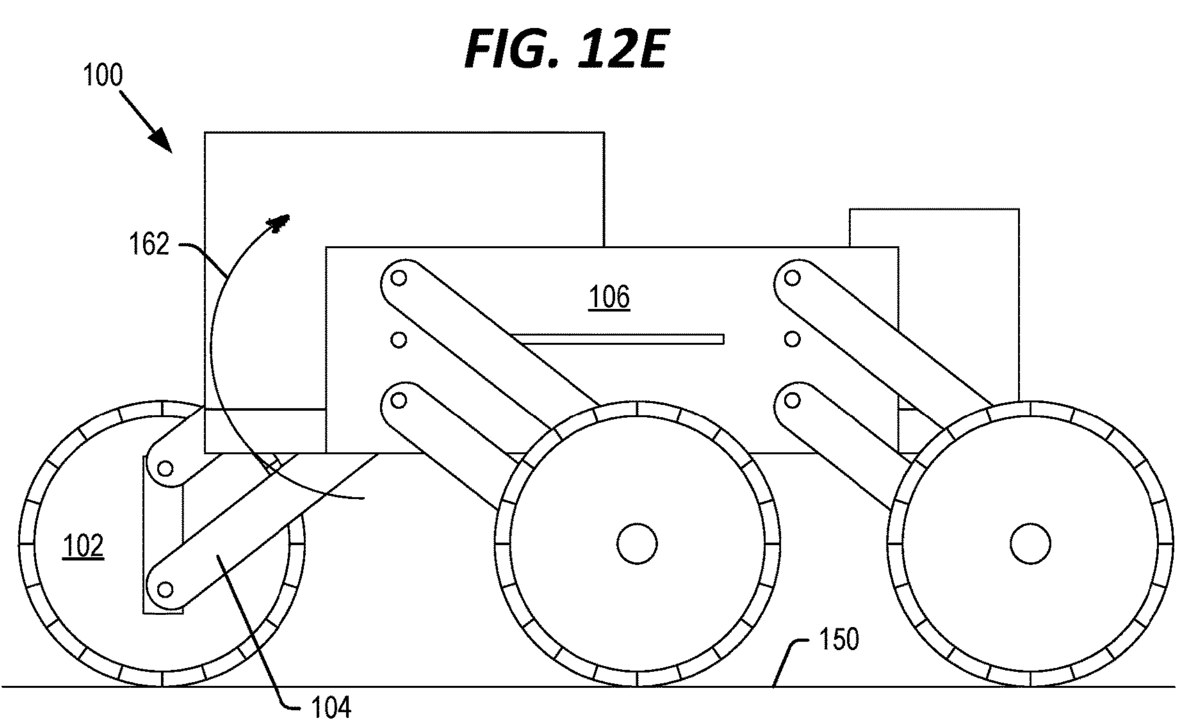
Figure 12F:
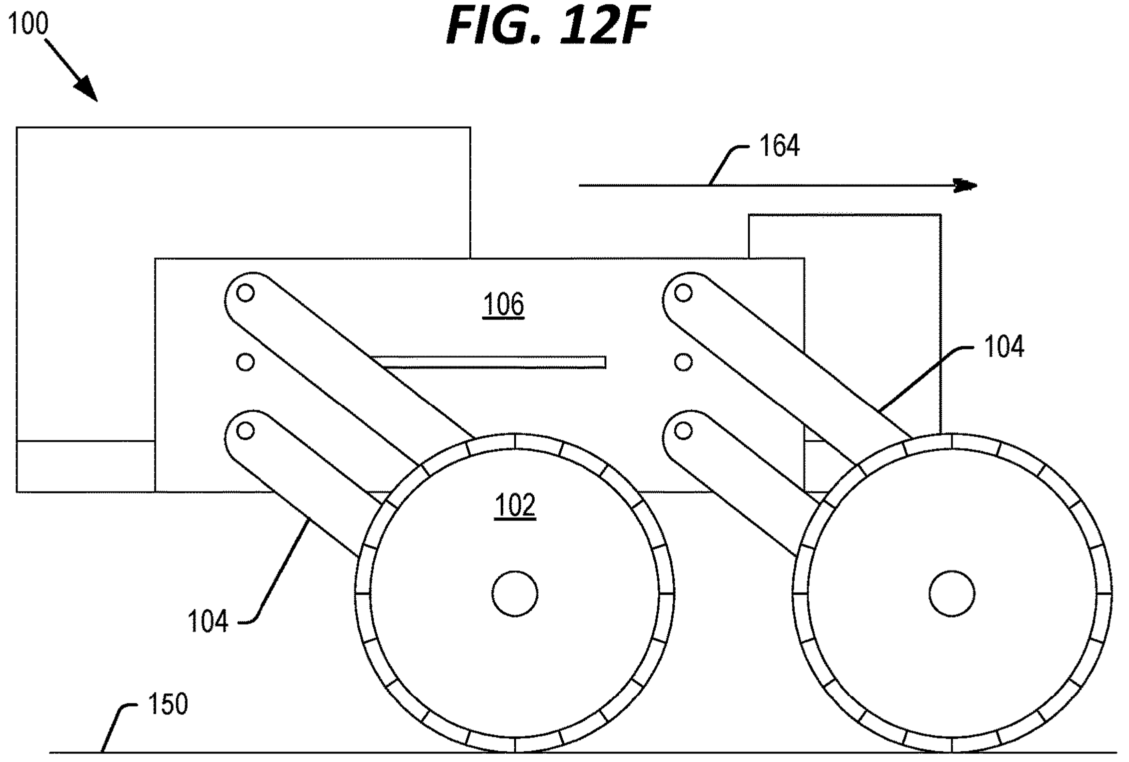
Figure 12G:
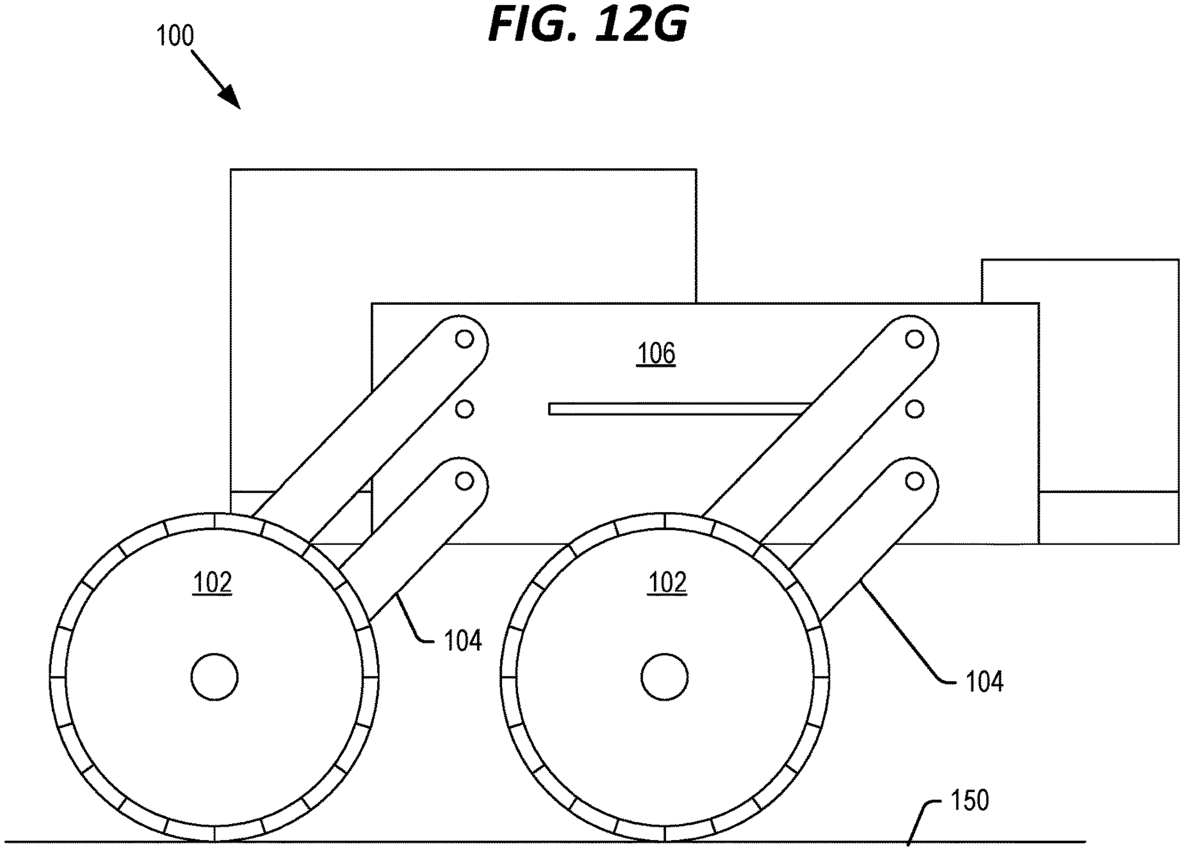

Next, the linkage assembly 104 associated with the rear right wheel 102 may rotate the rear right wheel as indicated by the arrow 160 from the position shown in FIG. 12D to the position shown in FIG. 12E. Thereafter, the linkage assembly 104 associated with the rear left wheel may rotate the rear left wheel as indicated by the arrow 162 in FIG. 12E until the rear left wheel is again on the ground in front of the chassis 106 as shown in FIG. 12F. At this point, the chassis 106 is behind each of the wheels, and each of the linkage assemblies may rotate in unison with the wheels remaining stationary to advance the chassis 106 in the direction of arrow 164 until the chassis is again ahead of all of the wheels as shown in FIG. 12G. At this point, the process described with respect to FIGS. 12A-12G may begin again to further step the rover 100 forward.

The order of wheel advancement described above for the walking mode of operation is by way of example, and different wheels may step forward in different orders in further embodiments. In a similar manner, the linkage assemblies may be actuated to step backward if desired. While the ground 150 is shown as being flat in FIGS. 12A-12G, the ground may be uneven or include obstacles. It is an advantage of the walking mode of operation that a wheel may step forward (such as the front right wheel shown in FIGS. 12A and 12B) until the wheel again touches down on the ground or on top of an obstacle. Once that wheel is in good contact with the ground or obstacle, it bears its share of the weight of the rover 100 while the next wheel steps.

Figure 13:
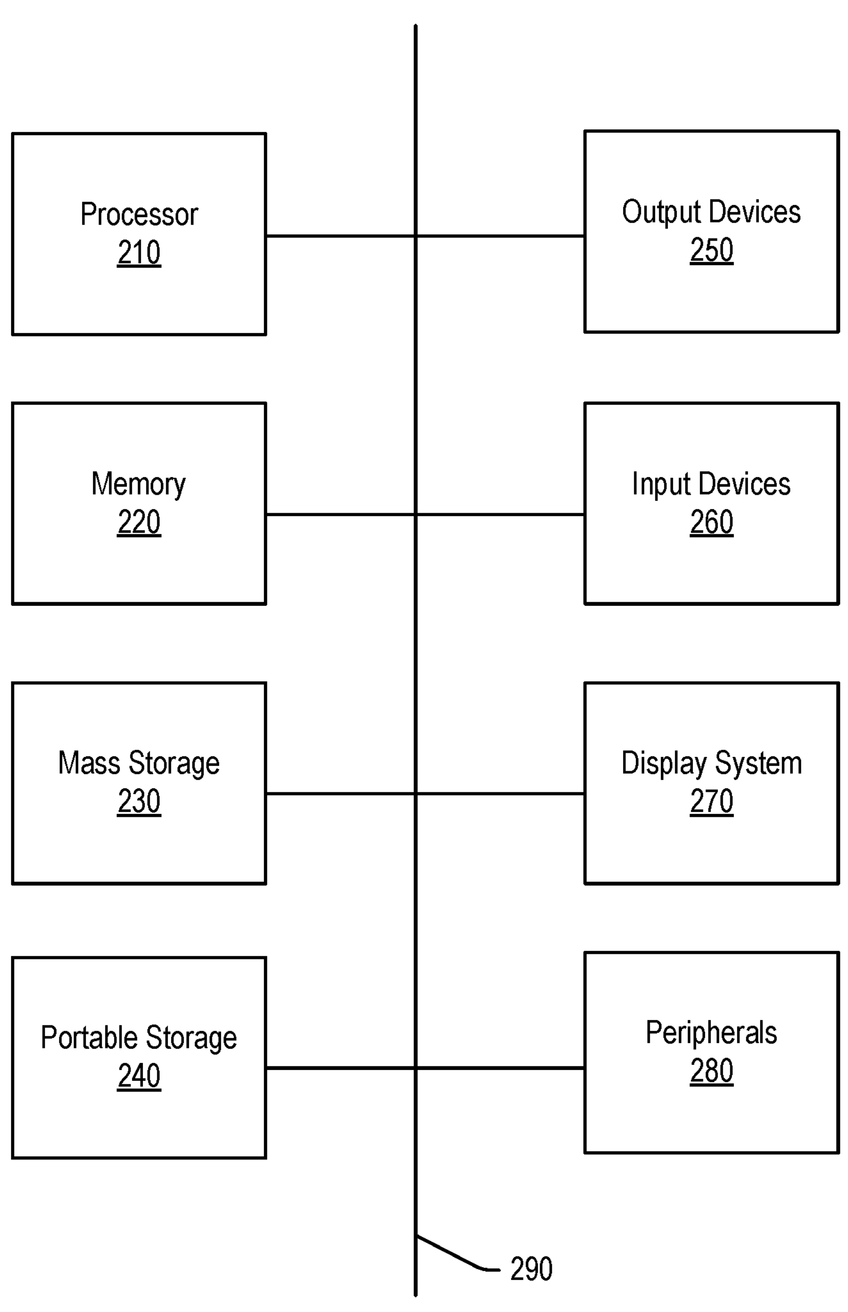
FIG. 13 is a schematic block diagram of a sample computing system according to embodiments of the present technology.

FIG. 13 illustrates an exemplary computing system 200 that may be used to control the actuation of the linkage assemblies 104 and other components of rover 100. The computing system 200 may be on the rover 100, or located remotely from the rover 100. The computing system 200 may include one or more processors 210 and main memory 220. Main memory 220 stores, in part, instructions and data for execution by processor unit 210. Main memory 220 can store the executable code when the computing system 200 is in operation. The computing system 200 of FIG. 13 may further include a mass storage device 230, portable storage medium drive(s) 240, output devices 250, user input devices 260, a display system 270, and other peripheral devices 280.

The components shown in FIG. 13 are depicted as being connected via a single bus 290. The components may be connected through one or more data transport means. Processor unit 210 and main memory 220 may be connected via a local microprocessor bus, and the mass storage device 230, peripheral device(s) 280, portable storage medium drive(s) 240, and display system 270 may be connected via one or more input/output (I/O) buses.

Mass storage device 230, which may be implemented with a magnetic disk drive, an optical disk drive or a solid state drive, is a non-volatile storage device for storing data and instructions for use by processor unit 210. Mass storage device 230 can store the system software for implementing embodiments of the present invention for purposes of loading that software into main memory 220.

Portable storage medium drive(s) 240 operate in conjunction with a portable non-volatile storage medium, such as a floppy disk, compact disk or Digital video disc, to input and output data and code to and from the computing system 200 of FIG. 13. The system software for implementing embodiments of the present invention may be stored on such a portable medium and input to the computing system 200 via the portable storage medium drive(s) 240.

Input devices 260 provide a portion of a user interface. Input devices 260 may include a joystick, an alpha-numeric keypad, such as a keyboard, for inputting alpha-numeric and other information, or a pointing device, such as a mouse, a trackball, stylus, or cursor direction keys. Additionally, the system 200 as shown in FIG. 13 includes output devices 250. Suitable output devices include speakers, printers, network interfaces, and monitors. The output device 250 may further include servo controls for the motors within the above-described actuators.

Display system 270 may include a liquid crystal display (LCD) or other suitable display device. Display system 270 receives textual and graphical information, and processes the information for output to the display device.

Peripheral device(s) 280 may include any type of computer support device to add additional functionality to the computing system. Peripheral device(s) 280 may include a modem or a router.

The components contained in the computing system 200 of FIG. 13 are those typically found in computing systems that may be suitable for use with embodiments of the present technology and are intended to represent a broad category of such computer components that are well known in the art. The computing system 200 can also include different bus configurations, networked platforms, multi-processor platforms, etc. Various operating systems can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the invention. Those skilled in the art are familiar with instructions, processor(s), and storage media.

It is noteworthy that any hardware platform suitable for performing the processing described herein is suitable for use with the present technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope be defined by the claims appended hereto.

What is claimed is:

1. A rover configured to advance over a surface, comprising: a chassis; a plurality of wheels having an axis of rotation; and a linkage assembly associated with each of the plurality of wheels coupling the plurality of wheel to the chassis, the linkage assembly associated with each of the plurality of wheels comprising a four-bar linkage comprising: a first link having a first end mounted at a first point on the chassis, and a second end mounted to one of an actuator and a strut adjacent a wheel of the plurality of wheels; a second link having a third end mounted at a second point on the chassis vertically below the first point, and a fourth end mounted to the one of the actuator and the strut adjacent the wheel of the plurality of wheels, wherein the first and second links are mounted so as to rotate about axes parallel to the axis of rotation of the wheels.

2. The rover of claim 1, wherein the first and second links are mounted at a canted angle off of the chassis.

3. The rover of claim 1, wherein the first and second links are configured to rotate through 360° without collision with each other.

4. The rover of claim 1, further comprising at least one linkage actuator affixed at at least one of the first, second, third and fourth ends of the links, the at least one linkage actuator configured to rotate the first and second links.

5. The rover of claim 4, wherein the at least one linkage actuator comprises first and second linkage actuators, the first linkage actuator driving the first link and the second linkage actuator driving the second link to rotate in unison with the first link.

6. The rover of claim 4, wherein the at least one linkage actuator comprises first and second linkage actuators, the first linkage actuator positioned at the second end of the first link and the second linkage actuator positioned at the fourth end of the second link.

7. The rover of claim 6, wherein the one of an actuator and strut comprises a steering actuator, and wherein the first and second linkage actuators are mounted at opposed ends of the steering actuator, rotation of at least a portion of the steering actuator relative to the first and second linkage actuators turning the wheel of the plurality of wheels.

8. The rover of claim 7, wherein the linkage assembly maintains the steering actuator in a vertical orientation as the first and second links rotate.

9. The rover of claim 8, further comprising a wheel actuator coupled to the steering actuator, rotation of at least a portion of the wheel actuator rotating the wheel of the plurality of wheels.

10. The rover of claim 1, further comprising an electrical line comprising a first portion affixed to the chassis and a second portion affixed to the one of the actuator and strut, rotation of the first and second links translating and not rotating the second portion of the electrical line relative to the first portion of the electrical line.

11. The rover of claim 1, further comprising a computing system for controlling operation of the linkage assembly associated with each of the plurality of wheels.

12. A rover configured to advance over a surface, comprising:

a chassis;

a plurality of wheels; and a plurality of linkage assemblies, each wheel having a linkage assembly of the plurality of linkage assemblies to couple the plurality of wheel to the chassis, each of the plurality of linkage assemblies configured to adjust a height of a wheel independently of others of the linkage assemblies relative to the chassis, and each of the plurality of linkage assemblies configured to rotate in continuous 360° circles, the linkage assembly associated with each of the plurality of wheels comprising:

a first link having a first end mounted at a first point on the chassis, and a second end mounted to one of an actuator and a strut at a wheel of the plurality of wheels;

a second link having a third end mounted at a second point on the chassis vertically below the first point, and a fourth end mounted to the one of the actuator and the strut at the wheel of the plurality of wheels.

13. The rover of claim 12, wherein the first and second links are mounted at a canted angle off of the chassis of between 5° and 45°.

14. The rover of claim 12, further comprising first and second linkage actuators affixed at at least two of the first, second, third and fourth ends of the links, the first and second linkage actuators configured to rotate the first and second links in unison with each other.

15. The rover of claim 14, wherein the first linkage actuator is positioned at the second end of the first link and the second linkage actuator positioned at the fourth end of the second link.

16. The rover of claim 14, wherein the one of an actuator and strut comprises a steering actuator, and wherein the first and second linkage actuators are mounted at opposed ends of the steering actuator, rotation of at least a portion of the steering actuator relative to the first and second linkage actuators turning the wheel of the plurality of wheels.

17. The rover of claim 1, further comprising an electrical line comprising a first portion affixed to the chassis and a second portion affixed to the one of the actuator and strut, rotation of the first and second links translating and not rotating the second portion of the electrical line relative to the first portion of the electrical line.

18. A rover configured to advance over a surface, comprising:

a chassis;

a plurality of wheels; and a plurality of linkage assemblies, each wheel having a linkage assembly of the plurality of linkage assemblies to couple the plurality of wheels to the chassis, the linkage assembly associated with each of the plurality of wheels comprising:

a first link having a first end mounted at a first point on the chassis and a second point adjacent a wheel of the plurality of wheels;

a second link having a third end mounted at a third point on the chassis vertically below the first point, and a fourth end mounted to a fourth point adjacent the wheel of the plurality of wheels;

wherein the plurality of linkage assemblies are configured to operate in a plurality of modes, comprising:

a first mode where the plurality of wheels are driven to propel the rover over the surface, the plurality of linkage assemblies configured to adjust a height of each wheel independently relative to the chassis to account for uneven terrain on the surface in the first mode; and a second mode where the plurality of wheels walk over the surface, the plurality of linkage assemblies configured to rotate the wheels through 360° in the second mode.

19. The rover of claim 18, the plurality of modes further including a third mode where the plurality of linkage assemblies position each of the wheels in an elevated position relative to the chassis so that the chassis is supported on the surface.

20. The rover of claim 18, further comprising sensors for sensing terrain over which the plurality of wheels travel, the sensors configured to provide feedback used to rotate the linkage assemblies and adjust positions of each wheel, independently of each other, to absorb shock and to maintain a uniform contact of the plurality of wheels with the surface.

21. A suspension configured to attach to a chassis of a rover to advance the rover in a space defined by orthogonal x, y and z axes, the suspension comprising: a plurality of wheels configured to rotate about the y-axis in a plane comprising the x-axis and z-axis; and a first link having a first end affixed at a first point on a wheel of the plurality of wheels, and the first link having a second end configured to attach at a second point on the chassis, the first and second points offset from each other along the y-axis, and the first link configured to rotate about the y-axis at the second point to trace a first conical path as the first link rotates; and a second link having a third end affixed at a third point on the wheel, and the second link having a fourth end configured to attach at a fourth point on the chassis, the third and fourth points offset from each other along the y-axis, and the second link configured to rotate about the y-axis at the fourth point to trace a second conical path as the second link rotates, the first and second links remaining parallel to each other as the first and second links rotate and trace out the first and second conical paths; wherein the first and second conical paths intersect each other; and wherein the first and second links are configured to rotate about the chassis through 360 degrees without collision with each other.

22. The suspension recited in claim 21, wherein the first point on the wheel is vertically above the third point on the wheel.

23. The suspension recited in claim 21, wherein the first end of the first link and the third end of the second link are indirectly mounted to the wheel by an actuator.

24. The suspension recited in claim 23, wherein the actuator is configured to drive rotation of the first and second links.

25. The suspension recited in claim 21, wherein the first end of the first link and the third end of the second link are indirectly mounted to the wheel by a strut.

26. The suspension of claim 21, further comprising an electrical line comprising a first portion configured to be affixed to the chassis and a second portion affixed to the wheel, rotation of the first and second links translating and not rotating the second portion of the electrical line relative to the first portion of the electrical line.

27. A suspension configured to attach to a chassis of a rover to advance the rover over a surface, the suspension comprising: a plurality of wheels; and a linkage assembly associated with each of the plurality of wheels configured to couple the plurality of wheel to the chassis, the linkage assembly associated with each of the plurality of wheels comprising a four-bar linkage comprising: a first link having a first end configured to mount at a first point on the chassis, and a second end mounted to one of an actuator and a strut adjacent a wheel of the plurality of wheels; a second link having a third end configured to mount at a second point on the chassis vertically below the first point, and a fourth end mounted to the one of the actuator and the strut adjacent the wheel of the plurality of wheels, wherein the first and second mounting points on the chassis are fixed with respect to the chassis and each other, and wherein the first and second links are configured to rotate through 360° without collision with each other.

28. The rover of claim 27, further comprising an electrical line comprising a first portion configured to be affixed to the chassis and a second portion affixed to the one of the actuator and strut, rotation of the first and second links translating and not rotating the second portion of the electrical line relative to the first portion of the electrical line.

29. The rover of claim 27, further comprising a computing system for controlling operation of the linkage assembly associated with each of the plurality of wheels.

* * * * *